United States Patent [19]

Akatsu et al.

[11] Patent Number: 4,693,491
[45] Date of Patent: Sep. 15, 1987

[54] SUSPENSION SYSTEM

[75] Inventors: Yousuke Akatsu, Yokohama; Hirotsugu Yamaguchi, Chigasaki; Naoto Fukushima, Kamakura; Sunao Hano, Yokosuka; Masaru Sugino, Fujisawa; Shin Takehara, Higashi Hiroshima; Shinichi Matsui, Yokosuka, all of Japan

[73] Assignee: Nissan Motor Co., Ltd., Yokohama, Japan

[21] Appl. No.: 820,369

[22] Filed: Jan. 21, 1986

[30] Foreign Application Priority Data

Jan. 22, 1985 [JP] Japan .................................. 60-10633
Feb. 5, 1985 [JP] Japan .............................. 60-15156[U]
May 20, 1985 [JP] Japan .............................. 60-75530[U]

[51] Int. Cl.⁴ ............................................. B60G 13/00
[52] U.S. Cl. ................................... 280/688; 188/378; 248/562; 248/636; 267/140.1
[58] Field of Search ............... 280/636, 673, 702, 688; 180/300; 267/11 A, 8 R, 140.1; 188/298, 378; 248/564, 562, 636

[56] References Cited

U.S. PATENT DOCUMENTS

| 3,752,270 | 8/1973 | Valdespino | 188/298 |
| 3,938,840 | 2/1976 | Haase et al. | 188/298 X |
| 4,121,812 | 10/1978 | Dousset | 188/298 X |
| 4,377,216 | 3/1983 | Ueno | 267/140.1 X |
| 4,600,863 | 7/1986 | Chaplin et al. | 267/140.1 X |

FOREIGN PATENT DOCUMENTS

| 1231965 | 1/1967 | Fed. Rep. of Germany | 188/298 |
| 57-191129 | 11/1982 | Japan | 180/300 |

Primary Examiner—John A. Pekar
Attorney, Agent, or Firm—Schwartz, Jeffery, Schwaab, Mack, Blumenthal & Evans

[57] ABSTRACT

A suspension system consists of a suspension rod interposed between a vehicle body side member and a wheel side member to elastically connect them. The suspension rod includes a first elastomeric member connected to the vehicle body side member and defining a first fluid chamber. A second elastomeric member is provided in the suspension rod structure to be connected to the wheel side member, defining a second fluid chamber. The first and second fluid chambers are communicated with each other through a fluid communication passage. An incompressive fluid is filled in the first and second fluid chambers and in the fluid communication passage, thereby constituting a fluid dynamic damper for suppressing resonance vibration of the suspension system.

45 Claims, 21 Drawing Figures

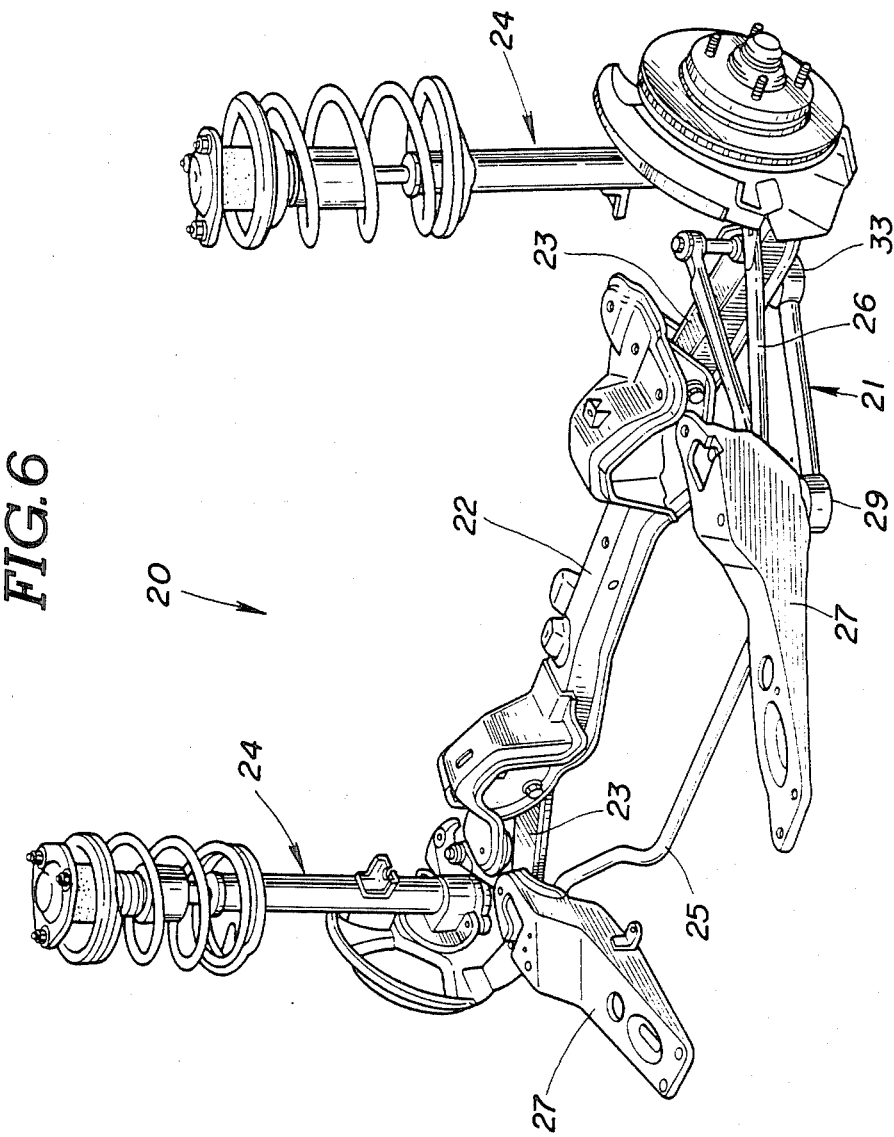

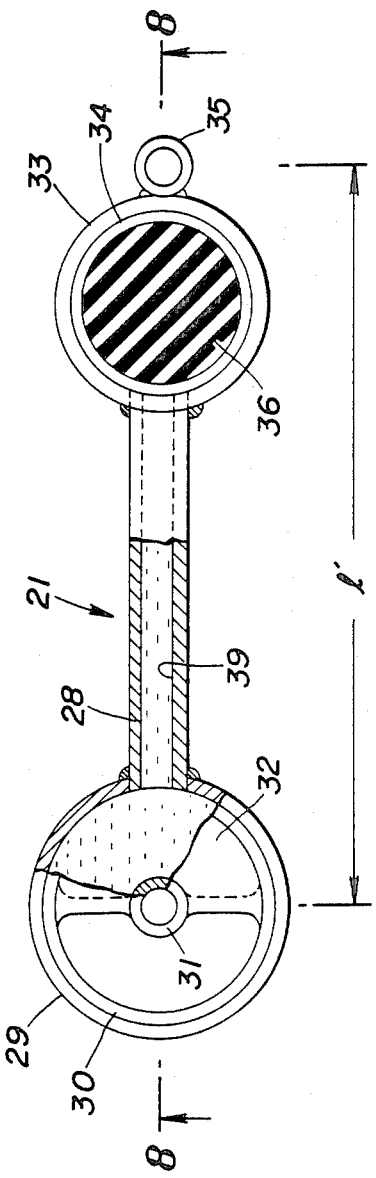
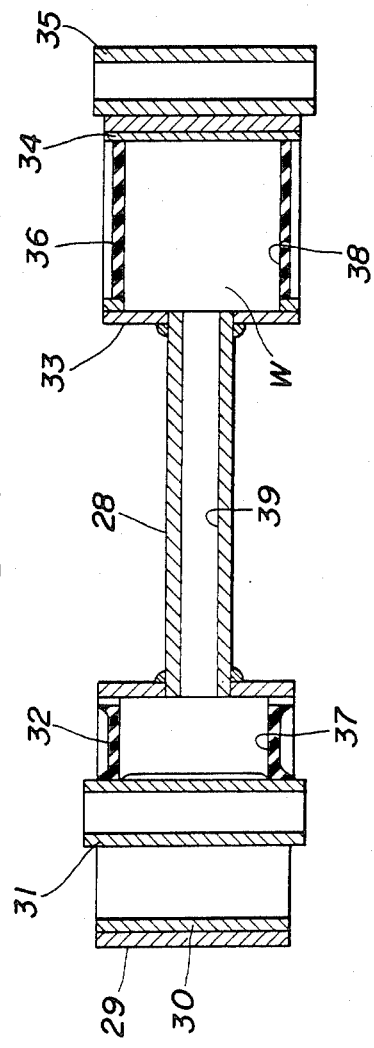

SUSPENSION SYSTEM

BACKGROUND OF THE INVENTION

1. Field of the Invention

The present invention relates to a suspension system of a vehicle and more particularly to a device having the function of a fluid dynamic damper for damping relatively low frequency vibrations of the vehicle, particularly in the fore-and-aft direction.

2. Description of the Prior Art

It is well known that a suspension system of an automotive vehicle consists of suspension rods each of which is adapted to connect a member on a wheel side to a member on a vehicle body side. Each suspension member is provided with a solid rubber bushing thereby to damp vibration transmitted from the wheel side to the vehicle body side.

However, such a suspension system is so arranged to achieve damping of the vibration input from the road wheel side to the vehicle body side only by the damping action of the rubber bushing itself. Accordingly, in the case the suspension system resonates at the frequency of the input vibration, the vibration supression action on a vehicle body is unavoidably deteriorated, thereby lowering damping function of the suspension system.

In view of the above shortcomings, in the case such a conventional suspension rod is used in a front suspension system, so-called harshness phenomena is caused by vibrations at 10 Hz to 40 Hz which are transmitted to the vehicle body from the wheels during vehicle cruising on an uneven paved road or like, thus increasing noise within a passenger compartment. Additionally, in the case such a conventional suspension rod is used in a front suspension system, vibrations at the frequencies lower than 20 Hz are transmitted to a steering system thereby to cause so-called shimmy phenomena, thus deteriorating steering stability.

SUMMARY OF THE INVENTION

A suspension system according to the present invention consists of an elongate structure interposed between a vehicle body side member and a wheel side member to connect them. The elongate structure includes a first elastomeric member connected to the vehicle body side member and defining a first fluid chamber which is variable in volume A second elastomeric member is provided in the elongate structure to be connected to the wheel side member and to define a second fluid chamber which is variable in volume. The first and second fluid chambers are in communication with each other through a fluid communication passage. A fluid is filled in the first and second fluid chambers and the fluid communication passage. It is to be noted that a fluid dynamic damper is constituted of the fluid serving as a mass and first and second elastomeric members whose elasticity serves as a spring. Consequently, the resonance vibration of the suspension system can be effectively suppressed by so adjusting the resonance frequency of the fluid dynamic damper to a resonance vibration range of the suspension system.

BRIEF DESCRIPTION OF THE DRAWINGS

The features and advantages of the suspension system according to the present invention will be more clearly appreciated from the following description taken in conjunction with the accompanying drawings in which same and like reference numerals designate corresponding elements and parts, and in which:

FIG. 6 is a perspective view of a suspension system according to the present invention;

FIG. 7 is a longitudinal sectional view of a damper rod forming a fluid dynamic damper, used in the suspension system of FIG. 6;

FIG. 8 is a sectional view taken in the direction of arrows substantially along the line 8—8 of FIG. 7;

DETAILED DESCRIPTION OF THE INVENTION

Figure 1:
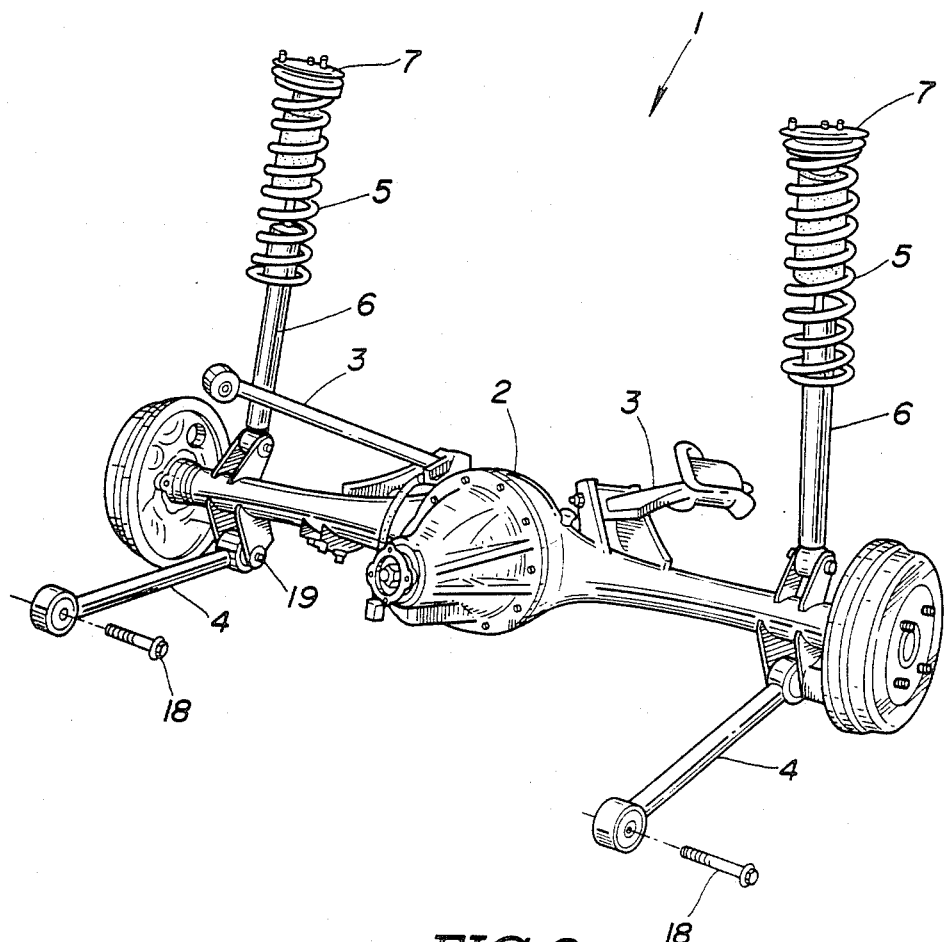
FIG. 1 is a perspective view of a first embodiment of a suspension system in accordance with the present invention.
Figure 2:
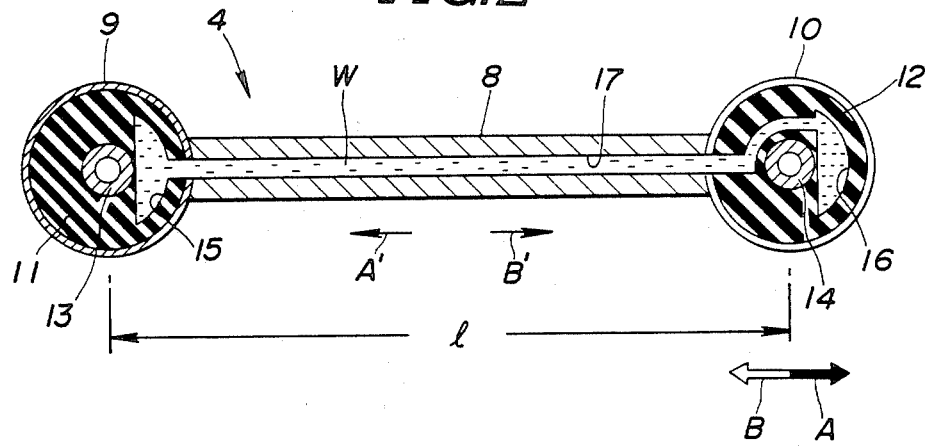
FIG. 2 is a longitudinal sectional view of a lower rod forming a fluid dynamic damper, used in the suspension system of FIG. 1.

Referring now to FIGS. 1 and 2, there is shown a first embodiment of a suspension system in accordance with the present invention, which system is a rear suspension system 1 of an automotive vehicle including a rear axle housing 2 within which differential gears and a drive pinion are disposed. The axle housing 2 is provided at its opposite ends with wheels (not shown). Two upper rods or links 3, 3 are provided. Each link 3 has one end supported to the rear axle housing 2, and the other end supported to a vehicle body (not shown). The two upper rods 3, 3 are angularly arranged relative to each other and function to support a load of a vehicle in the fore-and-aft direction and in the lateral direction. Two lower rods (rod structures) or links 4, 4 are provided in the similar manner to the upper rods 3, 3, so that one end of each lower rod 4 is supported to the rear axle housing 2 while the other end thereof is supported to the vehicle body. The two lower rods 4 are disposed parallel with each other and extend in the fore-and-aft direction of the vehicle, thereby supporting the load of the vehicle in the fore-and-aft direction.

Two shock absorbers 6, 6 are provided between the rear axle housing 2 and the vehicle body. A coil spring 5 is disposed around each shock absorber 6 and has one end connected to the vehicle body and the other end connected to the shock absorber 6. The shock absorber 6 and the coil spring 5 are arranged coaxial with each other thereby supporting the load of the vehicle in the upward-and-downward direction. Additionally, a mounting insulator 7 is disposed inside the coil spring 5 and located at an upper section at which the shock absorber 6 is connected to the vehicle body.

As shown in FIG. 2, each lower rod 4 consists of a rod 8 which has one end to which a vehicle body side outer cylinder 8 is integrally connected and the other end to which a wheel side outer cylinder 10 is integrally connected. A vehicle body side inner cylinder 13 is connected through a rubber bushing 11 with the vehicle body side outer cylinder 9 and located coaxial with the outer cylinder 9. A wheel side inner cylinder 14 is connected to the wheel side outer cylinder 10 and located coaxial with the outer cylinder 10. The vehicle body side inner cylinder 13 is fixedly connected to the vehicle body by means of a vehicle body side bolt 18. The wheel side inner cylinder 14 is fixedly connected to the rear axle housing 2 by means of a wheel side bolt 19. A first fluid chamber 15 is formed within the vehicle body side rubber bushing 11 and located on the side of the rod 8 relative to the inner cylinder 13. A second fluid chamber 16 is formed within the wheel side rubber bushing 12 and located on the opposite side of the rod 8 relative to the inner cylinder 14. The first and second fluid chambers 15, 16 are communicated with each other through a communication passage 17 whose major part is formed axially in the rod 8. A part of the communication passage 17 is formed also in the both the outer cylinders 9, 10 and both the rubber bushings 11, 12. The first and second fluid chambers and the communication passage 17 are filled with an incompressive fluid such as an antifreeze liquid. Accordingly, when the wheel side inner cylinder 14 moves in the direction of an arrow A in FIG. 1 to prolong a support or installation span λ upon movement of the rear axle housing 2 in the fore-and-aft direction, the first fluid chamber 15 expands while the second chamber 16 contracts, so that the fluid flows in the opposite direction to that of the arrow A, i.e., in the direction of an arrow A'. When the wheel side inner cylinder 4 moves in the direction of an arrow B to shorten the support span, the first fluid chamber 15 contracts while the second fluid chamber 16 expands, so that the fluid flows in the opposite direction to the direction of the arrow B, i.e., in the direction of an arrow B'.

It is to be noted that a fluid dynamic damper is constituted of a mass m corresponding to the fluid w, and a spring k (or damping c) corresponding to the elasticity of the rubber bushings 11, 12 caused by the expansion and construction of the first and second fluid chambers 15, 16. The fluid dynamic damper is so adjusted that the resonance frequency is approximately coincident with the resonance frequency of the rear suspension system 1 within a frequency range (from 10 Hz to 40 Hz) where so-called harshness phenomena is caused.

The manner of operation of the first embodiment suspension system 1 will be discussed hereinafter.

Figure 3:
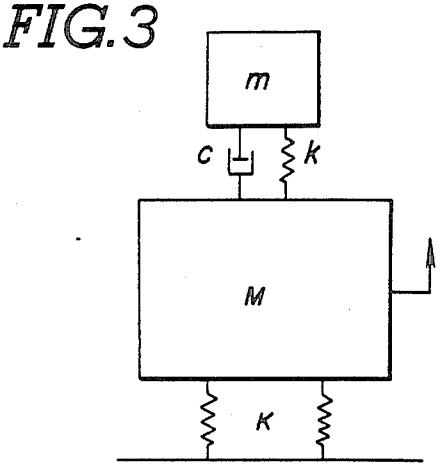
FIG. 3 is a diagrammatic illustration of a vibration system of the suspension system of FIG. 1.

The vibrating system of the first embodiment suspension system 1 is represented as a diagrammatic illustration in FIG. 3 and provided with two degrees of freedom. In this vibration system, a main vibrating system is constituted by a mass M of a wheel system including the rear axle housing 2 and the like, and a spring K due to rubber bushings 11, 12 and the like; while an auxiliary vibrating system is constituted by the mass m due to the filled fluid w, and the spring k (including the damping c) due to the elasticity of the rubber bushings 11, 12 caused by the expansion and construction of the first and second fluid chambers 15, 16. Accordingly, the principle of a dynamic damper is applicable to the vibrating system, in which the mass M of the main vibrating system can approach a standstill by causing the auxiliary vibrating system to resonate.

When vibration excitation force due to unevenness of road surface, dynamic unbalance of the wheels and the like is applied to the rear suspension system 1 at the same frequency as the resonance frequency f of the rear suspension system 1 in the fore-and-aft direction, a relative displacement in the fore-and-aft direction is made between the rear axle housing 2 and the vehicle body upon resonance arising. This fore-and-aft direction relative displacement causes the variation of the length of the support span λ, thereby deforming both the rubber bushings 11, 12. Consequently, each of the first and second fluid chambers 15, 16 expands or contracts, thereby causing the filled fluid w to flow. Almost all the work of the vibration excitation force made to the rear suspension system 1 is converted to kinetic energy for causing the filled fluid w to flow so that the filled fluid vigorously flows, because the resonance frequency $f_0$ of the fluid dynamic damper constituted by the filled fluid w and both the rubber bushings 11, 12 is approximately coincident with the resonance frequency f of the rear suspensing system 1. This vigorous flow of the filled fluid w damps resonance vibration of the rear suspension system 1 in the fore-and-aft direction within a short period of time. Thereafter, even if the vibration excitation force is continuously applied, the rear suspension system 1 hardly vibrates, allowing the filled fluid w to vigorously flow.

Figure 4:
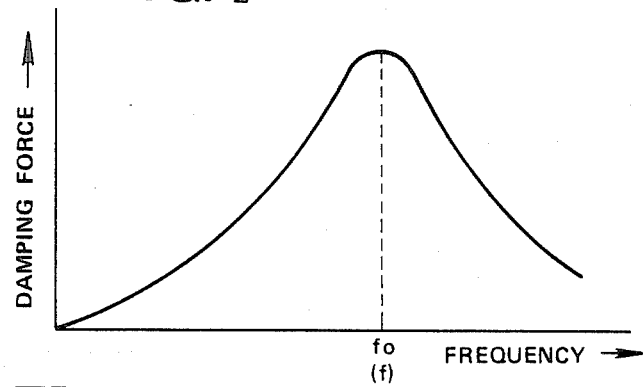
FIG. 4 is a graph of vibration damping characteristics of the fluid dynamic dmaper of FIG. 2.
Figure 5:
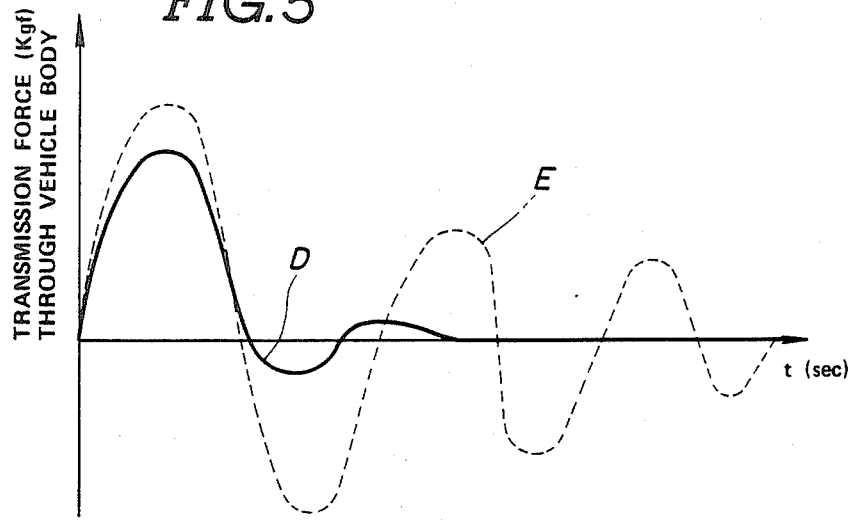
FIG. 5 is a graph of vibration transmission characteristics of the suspension system of FIG. 1.

As shown in FIG. 4, the damping force due to the fluid dynamic damper is the highest or most effective at the resonance frequency $f_0$ of the fluid dynamic damper. Additionally, as shown in FIG. 5 directing to vibration transmission characteristics, the vibration transmission force through the vehicle body immediately after the vibration excitation is smaller in the case (represented by a curve D) of using the lower rod 4 than in the case (represented by a curve E) of using a conventional suspension rod in place of the lower rod 4. Additionally, the converging time of the vibration transmission force is also extremely short in the case of using the lower rod 4 as compared with in the case of using the conventional suspension rod. The conventional suspension rod is provided at its opposite ends with a solid rubber bushing through which vibration is transmitted from a wheel side to a vehicle body side. The filled fluid w seems to flow in opposite phase shifted 90 degrees relative to the vibration of the rear suspension system 1 due to the vibration excitation force.

Thus, by virtue of the damping action of the fluid dynamic damper, the transmission of the vibration (within a range from 10 Hz to 40 Hz) due to resonance of the rear suspension system 1 to the vehicle body can be suppressed, thereby preventing the harshness phenomena. Furthermore, the damping action is caused by the fluid dynamic damper and therefore it is unnecessary to enlarge the damping coefficient of both the rubber bushings 11, 12 themselves thereby preventing the degradation of road noise suppression effect.

FIGS. 6 to 8 illustrate a second embodiment of the suspension system 20 according to the present invention, which system is a front suspension system 20 including a suspension member 22 which is elastically supported to the vehicle body. Two transverse links 23, 23 are pivotally connected to the opposite end sections, respectively, of the suspension member 22 in such a manner that they are pivotally movable in the upward-and-downward direction, so that the lateral load of the vehicle input from front wheels (not shown) is supported by the transverse links 23, 23. Two shock struts 24, 24 are so provided that each has an upper end connected to the vehicle body and a lower end connected to the transverse link 23, so that the load of the vehicle in the upward-and-downward direction is supported by the shock struts 24, 24. A stabilizer bar 25 is so installed that its opposite ends are connected to the transverse links 23, 23, respectively. The stabilizer bar 25 has a laterally extending section supported to the vehicle body, thereby preventing the vehicle body from inclination by virtue of torsional elasticity thereof in case only one of right and left front wheels moves upward and downward or in case the right and left front road wheels move in the opposite direction to each other.

Two tension rod 26, 26 are disposed to extend in the fore-and-aft direction of the vehicle to support the load of the vehicle in the fore-and-aft direction. Each tension rod 26 has one end connected to the transverse link 23 and the other end connected to a vehicle body side bracket 27. The tension rod 26 is provided with a rubber bushing of a lower damping characteritics in order to improve the transmission suppression effect of high frequency vibrations thereby to suppress load noise. Two damper rods (rod structures) 21, 21 are provided so that each is disposed to connect the transverse link 23 and the vehicle body side bracket 27.

As shown in FIG. 7 and 8, each damper rod 21 consists of a rod 28 which has one end to which a vehicle body side first outer cylinder 29 is securely connected. A vehicle body side second outer cylinder 30 is disposed inside the first outer cylinder 29 and securely connected to the inner surface of the first outer cylinder 29, thereby forming a double cylindrical wall construction. A wheel side first outer cylinder 33 is securely connected to the other end of the rod 28. A wheel side second outer cylinder 34 is disposed inside the first outer cylinder 33 and securely connected to the inner surface of the first outer cylinder 33, thereby forming a double cylindrical wall construction. A vehicle body side rubber bushing 32 is adhered to the vehicle body side second outer cylinder 30 under vulcanization-adhesion or the like, thereby defining a first fluid chamber 37. A wheel side rubber bushing 36 is adhered to the wheel side second outer cylinder 34 under vulcanization-adhesion or the like, thereby defining a second fluid chamber 38. A wheel side inner cylinder 35 is fixedly connected to the outer surface of the wheel side first outer cylinder 33 under welding or the like. The first and second fluid chambers 37, 38 are communicated with each other through a communication passage 39 formed axially in the rod 28. The first and second fluid chambers 37, 38 and the communication passage 39 are filled with the fluid w. A vehicle body side inner cylinder 31 is disposed inside the second outer cylinder 30, in which the rubber bushing 32 is disposed between the inner cylinder 31 and the second outer cylinder 30 and located on the side of the rod 28 relative to the inner cylinder 31 so that the first fluid chamber 37 occupies an about half of the space defined between the second outer cylinder 30 and the inner cylinder 31. The first fluid chamber 37 expands and contracts in accordance with the installation span $\lambda'$ as indicated in FIG. 7. The wheel side rubber bushing 36 is disposed throughout whole the inside of the second outer cylinder 34 so that the second fluid chamber 38 occupies the almost all the space defined inside the second outer cylinder 34. The second fluid chamber 38 expands and contracts upon the elastic deformation of the wheel side rubber bushing 36 caused with the flow of the filled fluid w.

The damper rod 21 of this embodiment serves as a fluid dynamic damper and therefore does not serve to support the load of the vehicle in the fore-and-aft direction, so that the thickness of both the bushings 32, 36 is relatively small thereby obtaining a relatively large volume of the filled fluid w. Additionally, a fluid dynamic damper is constituted of a mass corresponding to the filled fluid w, and a spring corresponding to the elasticity of both the rubber bushings 32, 36. The fluid dynamic damper is so adjusted as to have a resonance frequency which is approximately coincident with a resonance frequency of the front suspension system 20 within a frequency range (not higher than 20 Hz) where so-called shimmy phenomena is caused. In this embodiment, the damper rod is installed in such a manner that the axis of both the first outer cylinders 29, 33 is vertical or parallel with an imaginary vertical plane containing the axis of the rod 28.

The operation of the second embodiment suspension system is as follows:

When vibration excitation force due to a dynamic unbalance of the front wheels is applied to the front suspension system 20 at a frequency same as the resonance frequency of the front suspension system 20 in the fore-and-aft direction (due to resonance vibration of the system in which the traverse links 23, 23 and the like serve as the mass, and the rubber bushing of the tension rods 26 mainly serves as the spring), a fore-and-aft direction relative displacement is made between the front suspension system 20 and the vehicle body, so that the length of the installation span $\lambda'$ of the damper rod 21 changes. Thus, vibration damping action is made in the same mechanism as in the first embodiment suspension system 1, thereby damping the resonance vibration of the front suspension system 20 within a short period of time.

This vibration damping action of the fluid dynamic damper can sharply suppress the transmission of the vibration (at frequencies not higher than 20 Hz) due to the resonance vibration of the front suspension system 20 to a steering system and the vehicle body, thus preventing so-called shimmy phenomena of the steering system while avoiding an increase of noise within a passenger compartment. It will be understood that the second embodiment suspension system is additionally provided with the damper rod 21, and therefore the suppression of transmission of vibration within a high frequency range can be achieved by the tension rod 26 as conventional thereby to prevent deterioration of vibration transmission suppression effect within frequency ranges other than the range not higher than 20 Hz.

Figure 9:
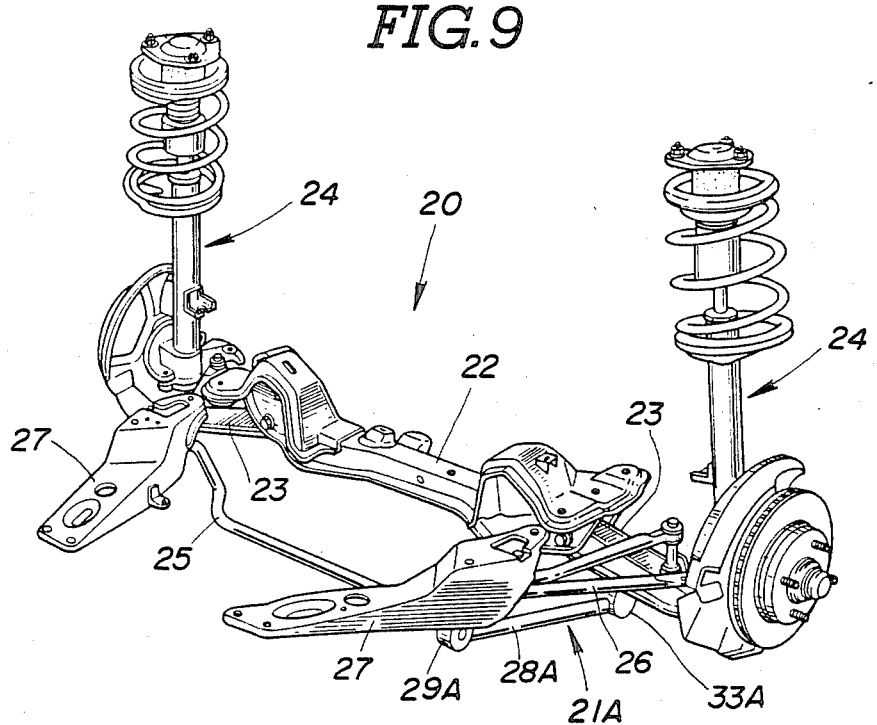
FIG. 9 is a perspective view similar to FIG. 6 but showing a third embodiment of the suspension system according to the present invention.

FIG. 9 illustrates a third embodiment of the suspension system 20 of the present invention, which is similar to the second embodiment suspension system except for the installation manner of the damper rod (rod structure) 21A which corresponds to and is substantially the same in construction as that 21 of the second embodiment. In this embodiment, the damper rod 21A is installed in such a manner that the axis of both the first outer cylinders 29A, 33A (corresponding to 29, 33 in the second embodiment) of the vehicle body side and the wheel side is horizontal or perpendicular to an imaginary vertical plane containing the axis of the rod 28A (corresponding to 28 in the second embodiment).

Figure 10:
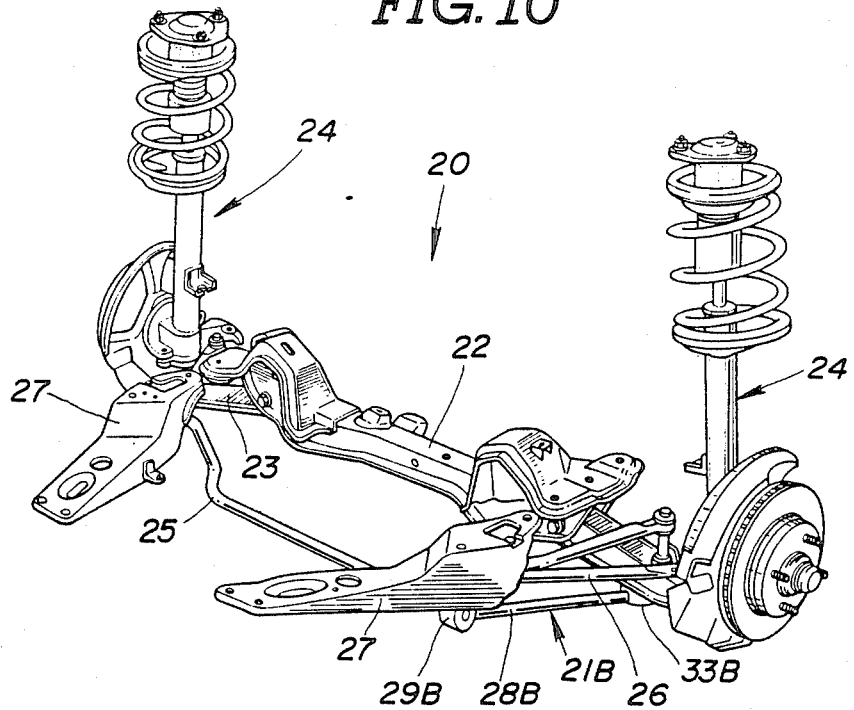
FIG. 10 is a perspective view similar to FIG. 6 but showing a fourth embodiment of suspension system according to the present invention.

FIG. 10 illustrates a fourth embodiment of the suspension system 20 of the present invention, which is also similar to the second and third embodiment suspension systems except for the installation manner of the damper rod (rod structure) 21B corresponding to that 21, 21A of the first and second embodiments. In this embodiment, the damper rod 21B is installed in such a manner that the axis of the first outer cylinder 29B (corresponding to 29 in the second embodiment) of the vehicle body side is horizontal or perpendicular to an imaginary vertical plane containing the axis of the rod 28B (corresponding to 28 in the second embodiment) while the axis of the first outer cylinder 33B (corresponding to 33 in the second embodiment) of the wheel side is vertical or parallel with an imaginary vertical plane containing the axis of the rod 28B.

It will be understood that selection of the installation manner of the damper rod 21, 21A, 21B can be made as illustrated in the second, third and fourth embodiments in accordance with the direction of vibration excitation input, thereby exhibiting the best fluid dynamic damper effect. It will be appreciated that a suspension rod for supporting the fore-and-aft direction vehicle load may be formed with the fluid chambers 15, 16 and the communication passage 17 thereby constituting a dynamic damper as in the first embodiment suspension system even in a front suspension system, while the damper rod 28 may be added to extend in the vehicle fore-and-aft direction as in the second, third, and fourth embodiments even in a rear suspension system.

Figure 11:
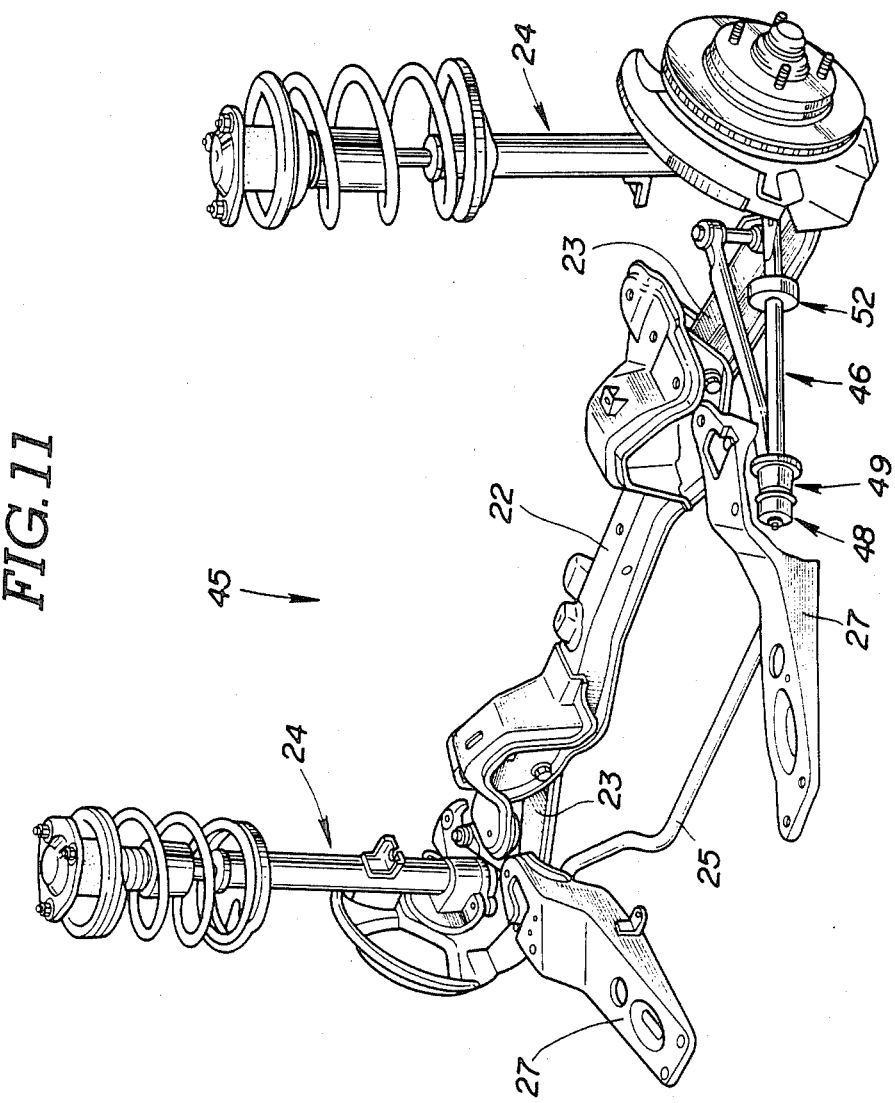
FIG. 11 is a perspective view similar to FIG. 6 but showing a fifth embodiment of the suspension system according to the present invention.
Figure 12:
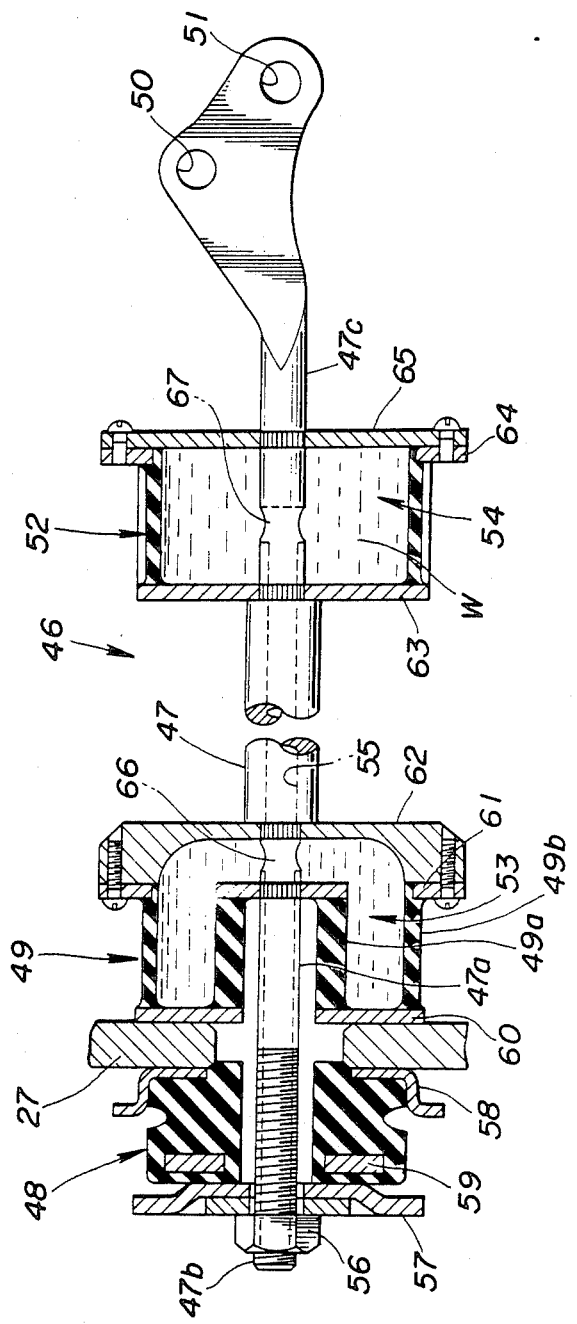
FIG. 12 is a longitudinal sectional view of a tension rod forming a fluid dynamic damper, used in the suspension system of FIG. 11.

FIGS. 11 and 12 illustrate a fifth embodiment of the suspension system 45 according to the present invention which is a front suspension system 45 and similar to that of the second embodiment with the exception that tension rods (rod structures) 46 are used in place of the tension rods 26 and the damper rods 21 of the second embodiment. Each tension rod 46 forming part of the suspension system 45 is disposed to mechanically connect the transverse link 23 and the vehicle body side bracket 27.

The tension rod 46 shown in detail in FIG. 12 consists of a rod 47 which is provided at a first end section with a thick rubber bushing 48 and first thin rubber wall members 49 in such a manner that a part of the vehicle body side bracket 27 is securely put between the rubber bushing 48 and the rubber wall members 49. A second end section of the rod 47 is provided with a second thin rubber wall member 52 and includes an extreme end formed with holes 50, 51 for a bolt. The first thin rubber wall members defines thereinside a first fluid chamber 53, while the second thin rubber wall member 52 defines thereinside a second fluid chamber 54. The first and second fluid chambers 53, 54 are communicated with each other through a communication hole 55 formed axially in the rod 47. Both the fluid chambers 53, 54 and the communication hole 55 are filled with the incompressive fluid w such as the antifreeze liquid.

The thick rubber bushing 48 and the first thin rubber wall members 49 are installed in such a manner that a first small diameter part 47a of the first end section of the rod 47 passes therethrough and fixed in position by means of a nut 47b engaged with a threaded portion 47b formed at the rod first small diameter part. The thick rubber bushing 48 is made of a rubber material having a smaller damping coefficient and provided at its opposite end sections with a collar 57 and a frame plate 58 in such a manner that the rubber bushing 48 is tightly put between the collar 57 pressed by the nut 56 and the frame plate 58 contacting to the bracket 27 upon tightening the nut 56. The thick rubber bushing 48 is provided therein with a plate 59 located on the side of the collar 57 in order to restrict the deformation of the rubber bushing 48.

The first thin rubber wall members 49 consists of an inner cylindrical wall section 49a, and an outer cylindrical wall section 49b. The opposite ends of the inner and outer cylindrical wall sections 49a, 49b are bonded to frame plates 60, 61, respectively. Additionally, a support plate 62 is fixed to the frame plate 61 on the side of the transverse link 23. The inner and outer cylindrical wall sections 49a, 49b are arranged coaxial with each other and spaced from each other, defining a space forming part of the first fluid chamber 53. The space is communicated through holes of the frame plate 61 with a depression formed in the support plate 62 which depression also serves as a part of the first fluid chamber 53. As shown, the inner and outer cylindrical wall sections 49a, 49b are disposed in such a manner that the first small diameter part 47a of the rod 47 passes through the inside of the inner cylindrical wall section 49a. Additionally, the frame plate 61 and the support plate 62 is fixedly mounted on the rod first small diameter part 47a.

The second thin rubber wall member 52 is cylindrical and has opposite ends bonded to frame plates 63, 64. The second thin rubber wall member 52 is disposed in such a manner that a second small diameter part 47c of the second section of the rod 47 passes through the second fluid chamber 54 defined by the inner wall surface of the second thin rubber wall member 52. The second fluid chamber 54 is defined also by the inner wall surfaces of the frame plate 23 and a support plate 65 fixed to the frame plate 24. The frame plate 63 and the support plate 65 are fixedly mounted on the rod second small diameter part 47c. The first thin rubber wall members 49 and the second thin rubber wall member 52 are both made of a rubber material having a smaller damping coefficient. The communication hole 55 is bored from the end face on the side of the vehicle body and closed in a suitable manner. The communication hole 55 is communicated through a first communication port 66 with the first fluid chamber 53 and through a second communication port 67 with the second fluid chamber 54.

It will be noted that a fluid dynamic damper is constituted of a mass corresponding to the fluid w filled in the first fluid chamber 53, the second fluid chamber 54, and the communication hole 15, and a spring corresponding to the elasticity of the first thin rubber wall member 49 and the second thin wall rubber members 52 due to the expansion and contraction of both the fluid chambers 53, 54 caused by the flow of the fluid w. This fluid dynamic damper is so adjusted as to have a resonance frequency coincident with a resonance frequency of the front suspension system 45 in the fore-and-aft direction, of a shimmy level (ranging from 10 to 15 Hz) at which the shimmy phenomena is caused.

The static load applied to the tension rod 46 upon the vehicle body pulling the front suspension system 45 is supported by the thick rubber bushing 48 At this thime, even if the tension rod 46 rotatably moves around its vehicle body side connecting section upon the upward-and-downward movement of the transverse link 23, such rotatable movement can be allowed since the vehicle body side connecting section is elastically supported to the vehicle body side bracket 27.

Figure 13:
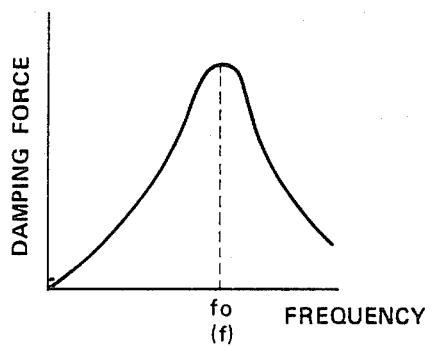
FIG. 13 is a graph of vibration damping characteristics of the fluid dynamic damper of FIG. 12.
Figure 15:
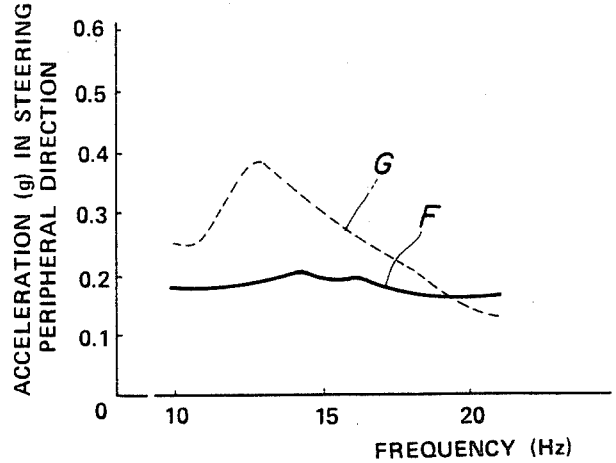
FIG. 15 is a graph of steering wheel peripheral direction acceleration characteristics in the case of using the suspension system of FIG. 12 in comparison with that in the case of using a suspension system employing the conventional tension rod of FIG. 16.
Figure 16:
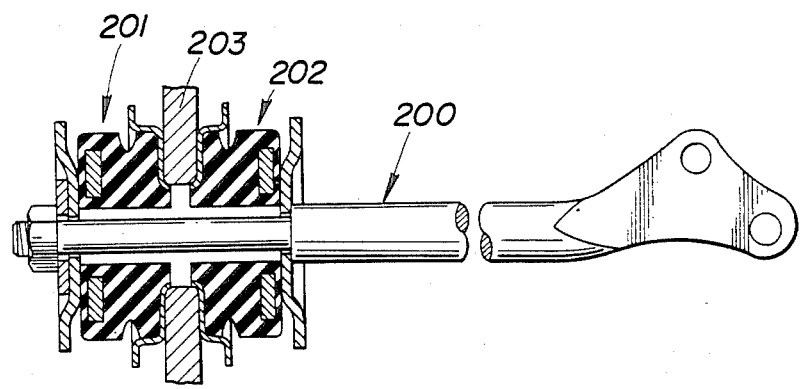
FIG. 16 is a sectional view of a conventional tension rod used in a suspension system.

When vibration displacement is made between the tension rod 46 and the vehicle body so that the vibration frequency becomes coincident with the resonance frequency (of the shimmy level) of the front suspension system 45 in the fore-and-aft direction, the fluid w filled in the tension rod 46 resonates. By virtue of the resonance of the fluid w, the energy of vibration is converted to the kinetic energy by which the fluid flows reciprocally within the communication hole 55 and consumed upon the contraction flow of the fluid w into the communication hole 55 from the first and second fluid chambers 53, 54, thus making a fluid dynamic damper action. This sharply decreases vibration of the shimmy level. In this connection, as shown in FIG. 13, the damping force of the fluid dynamic damper is highest at a resonance frequency $f_0$, and therefore it will be understood that a high damping effect of the fluid dynamic damper can be obtained by causing the resonance frequency f of the front suspension system 45 in the fore-and-aft direction to be approximately coincident with the above-mentioned resonance frequency $f_0$. Additionally, as apparent from FIG. 15, acceleration levels (indicated by a curve F) in the peripheral direction of a steering wheel (not shown) in the case of using the front suspension system 45 according to the present invention is largely lowered as compared with those (indicated by a curve G) in the case of using a conventional front suspension system in which a conventional tension rod 200 shown in FIG. 16 is employed in place of the tension rod 46. The tension rod 200 is provided with first and second solid rubber bushings 201, 202 which are located at a connecting section with a vehicle body side member and disposed in such a manner that a vehicle body side bracket 203 is fixedly put therebetween.

Figure 14:
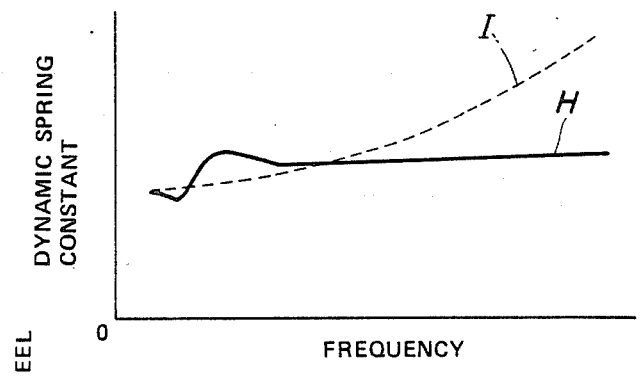
FIG. 14 is a graph of dynamic spring constant characteristics of elastomeric members of the tension rod of FIG. 12 in comparison with that of a conventional tension rod of FIG. 16.

When high frequency vibration (at a frequency not lower than 40 Hz) is applied to the tension rod 46, the fluid w within rod 46 does not move, so that the vibration is transmitted to the vehicle body through the thick rubber bushing 48, the first thin rubber wall members 49 and the fluid w within the first fluid chamber 53. Here, since the thick rubber bushing 48 and the first thin rubber wall members 49 are both smaller in damping coefficient, the transmission of vibration at high frequencies is also suppressed. In this connection, as shown in FIG. 14, in the case (indicated by a curve I) of the conventional tension rod 200 shown in FIG. 16, the dynamic spring constant gradually rises with the raised frequency, so that the vibration transmission in a high frequency range is greater. On the contrary, in the case (indicated by a curve H) of the tension rod 46 shown in FIG. 12, of the present invention, the rising rate of the dynamic spring constant is lower even in a high frequency range although there is an up-and-down variation of dynamic spring constant in the vicinity of the resonance frequency $f_0$ within a high frequency range. This reveals that vibration transmission within the high frequency range can be suppressed.

Figure 17:
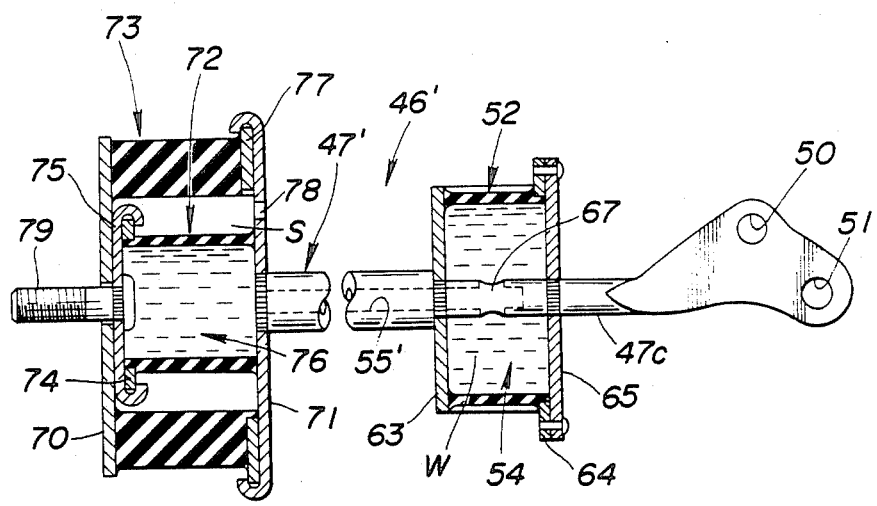
FIG. 17 is a longitudinal sectional view similar to FIG. 12 but showing a tension rod of a fixth embodiment of the suspension system.

FIG. 17 illustrates a tension rod (rod structure) 46' of a sixth embodiment of the suspension system according to the present invention. The tension rod 46' is similar to that 46 of the sixth embodiment with the exception that the rod 47' is provided at its first end section (connected to the vehicle body side) with a first thin rubber wall member 72 and a thick rubber bushing 73 which are arranged coaxial with each other.

A frame plate 71 is fixed to the extreme end of the first end section of the rod 47'. Additionally, another frame plate 70 is disposed parallel with and spaced from the frame plate 71. The first thin rubber wall member 72 is cylindrical and so disposed that the opposite ends thereof are secured to the frame plates 70, 71, respectively. More specifically, one of the opposite ends of the first thin rubber wall member 72 is bonded to an annular member 74 upon baking, the annular member 74 being rigidly connected to a plate 75 secured to the frame plate 70. The other of the first thin rubber wall member opposite ends is bonded to the frame plate 71 upon baking. A first fluid chamber 76 is defined inside the first thin rubber wall member 72 and communicated through the communication hole 47' with the second fluid chamber 54 defined inside the second thin rubber wall member 52. The thick rubber bushing 73 is cylindrical and located outside the first thin rubber wall member 72, maintaining an annular space S therebetween. The thick rubber bushing 73 is disposed between and secured to the frame plates 70, 71 in such a manner that the opposite ends thereof are securely connected to the frame plates 70, 71, respectively. More specifically, one of the opposite ends of the thick rubber bushing 73 is bonded to the frame plate 70 upon baking while the other is bonded a plate 77 upon baking, the plate 77 being secured to the frame plate 71. An air vent hole 78 is formed through the frame plate 71 to establish communication between the space S with the atmosphere. The reference numeral 79 designates a bolt for securely connecting the side of the frame plate 70 to vehicle body side.

It will be understood that an intermediate plate (not shown) formed of metal or the like may be disposed between the first thin rubber wall member 72 and the thick rubber bushing 73 to prevent the buckling of an incorporated unit including the first thin rubber wall member 72 and the thick rubber bushing 73. The operation of the sixth embodiment suspension system is substantially the same as that of the fifth embodiment suspension system, and therefore is omitted.

While the resonance frequency of the fluid dynamic damper in the fifth and sixth embodiment suspension systems is set at the shimmy level, it will be understood that the resonance frequency is set at a frequency level at which so-called harshness vibration and the like is caused. Furthermore, although, in the fifth and sixth embodiments, the principle of the structure of the present invention has been shown and described as being applied to front suspension systems, it will be appreciated that the principle may, be applicable to rear suspension systems, or applicable to a suspension rod which is provided at its opposite end sections with elastomeric materials. Additionally, the principle of the structure may be applicable to a suspension arm for supressing the vibration of a vehicle in the right-and-left direction without being limited to be applied to the rod structure for suppressing the fore-and-aft direction vibration.

Figure 18:
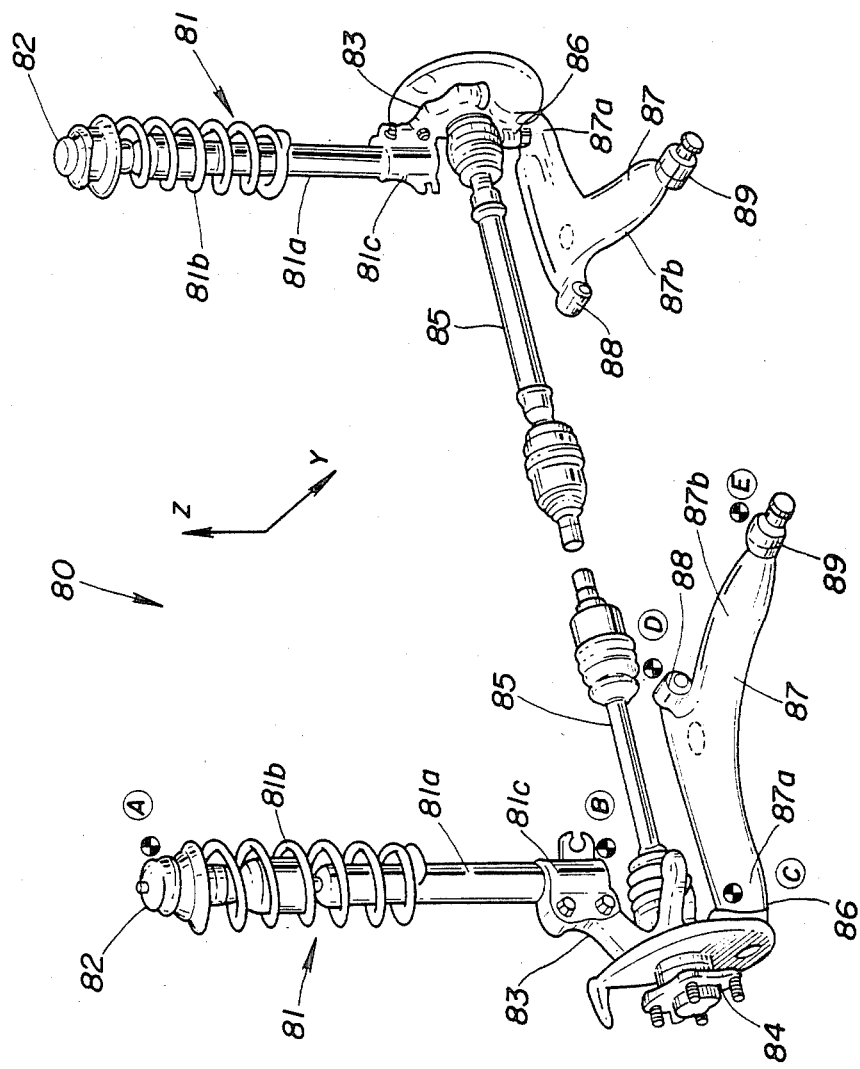
FIG. 18 is a perspective view of a seventh embodiment of the suspension system according to the present invention.
Figure 19:
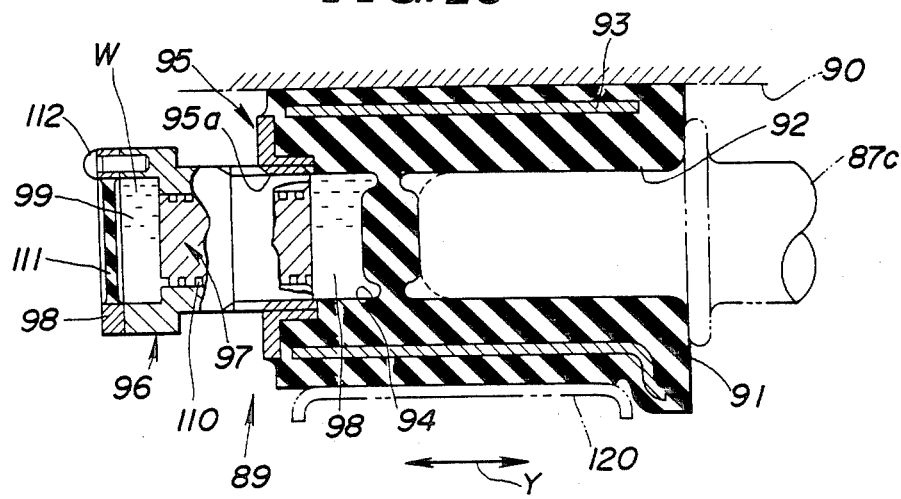
FIG. 19 is a longitudinal sectional view of a compression rod bushing forming a fluid dynamic damper, used in the suspension system of FIG. 18.
Figure 20:
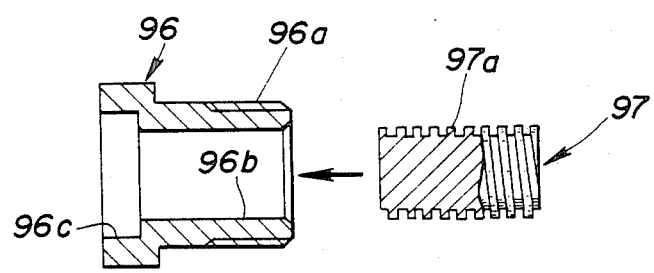
FIG. 20 is a sectional view of an essential part of the compression rod bushing of FIG. 19.

FIGS. 18, 19 and 20 illustrate a seventh embodiment of the suspension system according to the present invention. In this embodiment, the principle of the present invention is applied to a strut type independent front suspension system 80 mounted on a front engine front wheel drive type automotive vehicle. The front suspension system 80 includes two shock struts 81. Each shock strut 81 serves as a suspension member for supporting the load of the vehicle in the upward-and-downward direction (in the direction of an arrow Z) and consists of a shock absorber 81a and a coil spring 81b. The upper end section (a pivot A) of the strut 81 is supported through a mount insulator 82 to a vehicle body (not shown), while the lower end section (a pivot B) is installed to a strut bracket 81c. A knuckle 83 is an axle member to which the strut 81 and the axle side of a transverse link 87 are connected and to which a steering linkage (not shown) is connected. The knuckle 83 houses therein a wheel bearing (not shown) and disposed in such a manner that a wheel hub 84 and a drive shaft 85 assembled thereinto from the opposite sides of the wheel bearing, forming a so-called a serration connection. The drive shaft 85 is a shaft member which rotational drive force from an engine (not shown) and a transmission (not shown) is transmitted to road wheels (not shown) and tires via a wheel hub 84. The transverse link 87 is a suspension member for supporting the load of the vehicle in the lateral direction and in the fore-and-aft direction (in the direction of an arrow Y). The transverse link 87 has a knuckle side support section 87a (a pivot C) connected through a ball joint 86 to the knuckle 83, and a vehicle body side support section 87b including a transverse link bushing 88 (a pivot D) and a compression rod bushing (bushing structure) 89 (a pivot E), the bushings 88, 89 being connected to the vehicle body 90 or a member on the vehicle body side.

The compression rod bushing 89 as shown in detail in FIG. 19 consists of an elastomeric member 91 made of a rubber or the like and is formed generally in the shape of a rectangular parallelpiped in which a lower section is rounded to be semicylindrical throughout the length thereof. The elastomeric member 91 is formed with a first cylindrical bore 92 to which a compression rod 87c secured to the transverse link 87 is press-fitted. The first cylindrical bore 92 is bored from an end face of the elastomeric member 91 and extends in the elastomeric member axial direction (corresponding to the fore-and-aft direction of the vehicle). A second cylindrical bore 94 is formed in the elastomeric member 91 to define therein a first fluid chamber 98. The second cylindrical bore 94 is bored from the other end face of the elastomeric member 91 and extends in the elastomeric member axial direction. A reinforcement plate 93 is embedded in the elastomeric member 91 to obtain a necessary rigidity. The installation of the elastomeric member 91 is made in such a manner that a cramp 120 having a U-shaped cross-section is disposed to contact the outer peripheral surface of the semicylindrical lower section of the elastomeric member 91 and installed to the vehicle body 90.

A fixed plate 95 is secured to the inlet section of the second cylindrical bore 94 upon baking and formed on its inner surface with an internal thread 95a. A bolt-like or plug-like member 96 is generally cylindrical and formed at one end thereof with an external thread 96a engaged with the internal thread 95a of the fixed plate 95. The bolt-like member 96 is formed thereinside a smaller cylindrical bore 96b in which a trapezoidal thread member 97 is securely disposed. A larger cylindrical bore 96c is formed in the bolt-like member 96 to be merged with the smaller cylindrical bore 96b. A second fluid chamber 99 is defined in the larger cylindrical bore 96c.

The trapezoidal thread member 97 is generally cylindrical and formed at its outer periphery with screw threads 97a having a trapezoidal cross-section. The outer diameter of the trapezoidal thread member 97 is slightly larger than the inner diameter of cylindrical bore 96b, so that the trapezoidal thread member 97 is press-fitted in the cylindrical bore 96b. Accordingly, a helical communication passage 110 is formed as thread grooves each defined between the adjacent screw threads 97a. The herical communication passage 110 extends helically to establish fluid communication between the first and second fluid chambers 98, 99.

An annular elastomeric member support plate 98 is secured to the bolt-like member 96 by means of small screws 112. A rubber disc 111 is secured to the inner periphery of the support plate 98 in such a manner as to cover the bore 96c, thereby defining the second fluid chamber 99. The first and second fluid chambers 98 and the helical communication passage 110 are filled with the fluid w such as antifreeze fluid.

It is to be noted that a fluid dynamic damper is constituted of a mass corresponding to the fluid w filled in the helical communication passage 110, and a spring corresponding to the elasticity of the elastomeric member 91 and the rubber disc 111. The fluid dynamic damper is so adjusted as to have a resonance frequency within a resonance range (in the vicinity of 20 Hz) of an unsprung members of the front suspension system 80.

Figure 21:
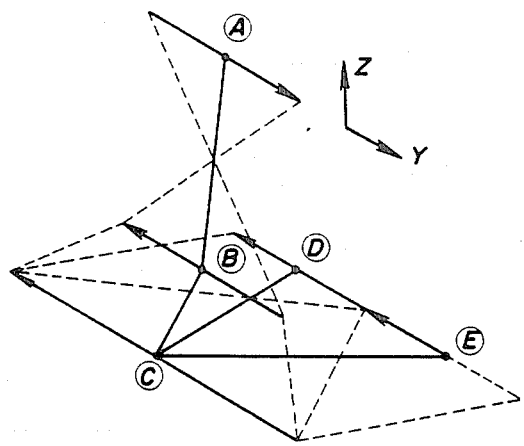
FIG. 21 is a diagrammatic illustration of vibration mode of the suspension system of FIG. 18.

The operation of the seventh embodiment suspension system 80 is as follows:

For example, in the case the front suspension system 80 resonates upon receiving torque input from the drive shaft 85 and vibrates in a vibration mode as shown in FIG. 21, vibration of the vehicle in the fore-and-aft direction is input to the compression rod bushing 89 at the pivot E from the compression rod 87c. At this time, in the compression rod bushing 89 which thus receives vibration input in the vehicle fore-and-aft direction, the fluid in both the chambers 98, 99 flows in accordance with the vibration input. When the vibration of the front suspension system 80 approaches the resonance frequency range, the dynamic spring constant of the compression rod bushing 89 lowers, thereby suppressing vibration transmission to the vehicle body 90. Furthermore, when vibration frequency of the front suspension system 80 becomes coincident with the resonance frequency of the fluid dynamic damper, vibration damping force is produced under the fluid dynamic damper action in which the resonance vibration of the unsprung members is replaced with the resonance vibration of the fluid dynamic damper, thereby abruptly minimizing the vibration amplitude, thus converging vibration transmission force to a lower level within a short period of time. It will be understood that the fluid w violently flows through the helical communication passage 110 thereby to convert vibration energy to fluid flow energy during the resonance vibration of the fluid dynamic damper. This fluid flow energy is consumed by the contraction flow caused when the fluid w flows through the the helical communication passage 110.

While the bushing according to the principle of the present invention has been shown and described as being applied to the compression rod bushing in the seventh embodiment, it will be understood that the bushing may be applicable to a bushing of a tension rod. Additionally, although the axis of the bushing of the sixth embodiment has been shown and described as corresponding to the direction of vehicle fore-and-aft direction, it will be understood that the bushing of the present invention may be applicable to a bushing whose axis slightly deviates from the vehicle fore-and-aft direction. Moreover, while the resonance frequency of the fluid dynamic damper has been described as being adjusted to the vicinity of 20 Hz in connection with the bushing of the seventh embodiment, it will be appreciated that the resonance frequency may be adjusted to a resonance frequency of a suspension system whose vibration is required to be suppressed.

What is claimed is:

1. A suspension system of a vehicle, comprising:
   a first member supported by a vehicle body of said vehicle;
   a second member supported by a wheel support structure of said vehicle;
   an elongate structure interposed between said first and second members to connect them, said structure including:
   a first rigid member connected to said first member,
   a second rigid member connected to said second member,
   a first elastomeric member secured to said first rigid member and defining a first fluid chamber which is variable in volume,
   a second elastomeric member secured to said second rigid member and defining a second fluid chamber which is variable in volume,
   means defining a fluid communication passage through which said first and second fluid chambers are fluidly connected with each other, said means defining a fluid communication passage including a third rigid member securely connecting said first and second rigid members, said third rigid member having a constant axial length so that the distance between said first and second elastomeric members is substantially constant,
   a fluid filling said first and second fluid chambers and said fluid communication passage, and
   means for forming a fluid dynamic damper with said fluid and said first and second elastomeric members, said fluid dynamic damper having a resonance frequency approximately coincident with a resonance frequency of a vibration system including said elongate structure.

2. A suspension system as claimed in claim 1, wherein said elongate structure has an axis parallel with a fore-and-aft direction of said vehicle.

3. A suspension system as claimed in claim 1, wherein said first elastomeric member is connected to said first member and said second elastomeric member is connected to said second member.

4. A suspension system as claimed in claim 3, wherein said first rigid member of said elongate structure includes a first frame member inside which said first elastomeric member is disposed to be secured to said first frame member, and said second rigid member includes a second frame member inside which said second elastomeric member is disposed to be secured to said second frame member.

5. A suspension system as claimed in claim 4, wherein said elongate structure includes a first support member disposed inside said first frame member and directly connected to said first elastomeric member, said first support member being directly connected to said first member, and a second support member connected to said first elastomeric member and to said second member.

6. A suspension system as claimed in claim 5, wherein a distance between said first and second support members is variable in accordance with a relative displacement between said first and second members.

7. A suspension system as claimed in claim 5, wherein said second support member is disposed inside said second frame member and directly connected to said second elastomeric member.

8. A suspension system as claimed in claim 7, wherein said first and second frame members are cylindrical, and said first and second elastomeric members are cylindrical, in which said elongate structure includes a rod connecting said first and second cylindrical frame members, said fluid communication passage being formed axially in said rod.

9. A suspension system as claimed in claim 8, wherein said first support member is disposed in a central portion of said first elastomeric member, and a second support member is disposed in the second elastomeric member.

10. A suspension system as claimed in claim 9, wherein said first fluid chamber is formed in said first elastomeric member and located on a first side of said rod relative to said first support member, and said second fluid chamber is formed in said second elastomeric member and located on an opposite side of said rod relative to said second support member.

11. A suspension system as claimed in claim 7, wherein said suspension system is a rear suspension system, in which said fluid and said first and second elastomeric members constitutes a fluid dynamic damper having a resonance frequency approximately coincident with a resonance frequency of said suspension system in a frequency range from 10 Hz to 40 Hz.

12. A suspension system as claimed in claim 11, wherein said elongate structure is a lower rod structure connecting said first member and said second member, in which said first member is directly connected to a vehicle body, and said second member is directly connected to a rear axle housing.

13. A suspension system as claimed in claim 5, wherein said second support member is disposed outside said second frame member and directly connected to said second frame member.

14. A suspension system as claimed in claim 13, wherein said first and second frame members are cylindrical, in which said elongate structure includes a rod connecting said first and second cylindrical frame members, said fluid communication passage being formed axially in said rod.

15. A suspension system as claimed in claim 14, wherein said first elastomeric member is disposed in a manner that said first fluid chamber occupies a part of a space defined inside said cylindrical first frame, said first fluid chamber being smaller in volume than said second fluid chamber.

16. A suspension system as claimed in claim 15, wherein said first support member is disposed in a central portion of said first cylindrical frame member, in which said first fluid chamber is located on a side of said rod relative to said first support member.

17. A suspension system as claimed in claim 5, wherein said suspension system is a front suspension system, in which said fluid and said first and second elastomeric members constitute a fluid dynamic damper having a resonance frequency approximately coincident with a resonance frequency of said front suspension system in a frequency range not higher than 20 Hz.

18. A suspension system as claimed in claim 17, wherein said elongate structure is a damper rod structure connecting said first member and said second member, in which said first member is directly connected to a vehicle body side bracket, and said second member is directly connected to a traverse link.

19. A suspension system as claimed in claim 1, wherein said elongate structure includes a third elastomeric member which is larger in volume than said first and second elastomeric members, said third elastomeric member being connected to said first member.

20. A suspension system as claimed in claim 19, wherein said third elastomeric member is connected to said first member in a manner that said first member is securely put between said first and third elastomeric members.

21. A suspension system as claimed in claim 19, wherein said elongate structure includes a rod along which said first, second, and third elastomeric members are disposed, said fluid communication passage being defined axially in a part of said rod.

22. A suspension system as claimed in claim 21, wherein said first elastomeric member includes a first cylindrical wall member, and a second cylindrical wall member whose inner diameter is larger than an outer diameter of said first cylindrical wall member, said first cylindrical wall member being disposed inside said second cylindrical wall member, said first and second cylindrical wall members being disposed coaxial with said rod, said first fluid chamber being defined between said first and second cylindrical wall members.

23. A suspension system as claimed in claim 22, wherein said second elastomeric member includes a third cylindrical wall member disposed coaxial with said rod and defining thereinside said second fluid chamber.

24. A suspension system as claimed in claim 23, wherein said third elastomeric member includes an annular elastomeric block disposed coaxial with said rod.

25. A suspension system as claimed in claim 19, wherein said elongate structure includes a rod having a first end, and a second end connected to said first member, in which said first, second and third elastomeric members are cylindrical and disposed coaxial with an extension of an axis of said rod, said fluid communication passage being formed axially in a part of said rod.

26. A suspension system as claimed in claim 25, wherein said first elastomeric member includes a first thin cylindrical rubber wall member securely disposed between first and second support plates, said first support plate being secured to the first end of said rod, said second support plate being securely connected to said first member.

27. A suspension system as claimed in claim 26, wherein said second elastomeric member includes a second thin cylindrical rubber wall member defining thereinside said second fluid chamber.

28. A suspension system as claimed in claim 27, wherein said third elastomeric member includes a thick cylindrical rubber wall member securely disposed between said first and second support plates and located around said first thin cylindrical rubber wall member.

29. A suspension system as claimed in claim 25, wherein said first thin cylindrical rubber wall member and said thick cylindrical rubber wall member are spaced from each other to form therebetween a space in communication with the atmospheric air.

30. A suspension system as claimed in claim 19, wherein said suspension system is a front suspension system, in which said fluid and said first and second elastomeric members constitute a fluid dynamic damper having a resonance frequency approximately coincident with a resonance frequency of said front suspension system in a frequency range from 10 Hz to 15 Hz.

31. A suspension system as claimed in claim 30, wherein said elongate structure is a tension rod structure connecting said first member and said second member, in which said first member is directly connected to a vehicle body side bracket, and said second member is directly connected to a traverse link.

32. A suspension system as claimed in claim 1, wherein said first elastomeric member is elongated and is formed axially with a first bore which defines therein said first fluid chamber, said first elastomeric member being supported at its outer surface by said first member and connected to said second member.

33. A suspension system as claimed in claim 32, wherein said elongate structure includes a plug-like member secured to said first elastomeric member in a manner to define said first fluid chamber, said plug-like member being formed with a space defining said second fluid chamber, said space being communicated with said first bore.

34. A suspension system as claimed in claim 33, wherein said second elastomeric member is disposed to cover said space to define said second fluid chamber.

35. A suspension system as claimed in claim 33, wherein said plug-like member is generally cylindrical and formed with second and third bores which are communicable with each other, said second bore being communicable with said first bore, said plug-like member being formed at its outer surface with an external thread, said plug-like member including a cylindrical member fitting in said second bore, said third bore being covered with said second elastomeric member to define said second fluid chamber, in which said fluid communication passage is formed in said cylindrical member.

36. A suspension system as claimed in claim 35, wherein said elongate structure includes a cylindrical plate secured to said first elastomeric member. said cylindrical plate being formed with an internal thread with which said external thread of said plug-like member engages.

37. A suspension system as claimed in claim 36, wherein said cylindrical member is formed at its outer peripheral surface with screw threads having a trapezoidal cross-section so that a continuous groove serving as said fluid communication passage is formed along said screw threads.

38. A suspension system as claimed in claim 37, wherein said cylindrical member is disposed in a manner that top surface of said screw threads is in tight contact with the surface of said second bore.

39. A suspension system as claimed in claim 37, wherein said first elastomeric member is formed with a fourth bore into which a rod section of said second member is securely disposed.

40. A suspension system as claimed in claim 39, wherein said fourth bore is located coaxial with said first bore.

41. A suspension system as claimed in claim 40, wherein second member rod section is located coaxial with said first elastomeric member.

42. A suspension system as claimed in claim 41, wherein said second and third bores of said plug-like member are located coaxial with said first bore.

43. A suspension system as claimed in claim 32, wherein said suspension system is a front suspension system, in which said fluid and said first and second elastomeric members constitute a fluid dynamic damper having a resonance frequency approximately coincident with a resonance frequency of unsprung members of said front suspension system in vicinity of 20 Hz.

44. A suspension system as claimed in claim 40, wherein said elongate structure is a compression rod bushing structure forming part of a transverse link.

45. A suspension system of a vehicle, comprising:
a first member supported by a vehicle body;
a second member supported by a wheel support structure; and
an elongate structure interposed between said first and second members to connect them, said elongate structure including:
a first elastomeric member connected to said first member and defining a first fluid chamber which is variable in volume,
a second elastomeric member connected to said second member and defining a second fluid chamber which is variable in volume,
means defining a fluid communication passage through which said first and second fluid chambers are fluidly connected with each other, and
a fluid filling said first and second fluid chambers and said fluid communication passage,
wherein said first fluid chamber is formed in said first elastomeric member and located on a first side of said first member relative to said elongate structure and said second fluid chamber is formed in said second elastomeric member and located on an opposite side of said second member relative to said elongate structure.

* * * * *